US012559343B2

(12) United States Patent
Schönauer

(10) Patent No.: US 12,559,343 B2
(45) Date of Patent: Feb. 24, 2026

(54) EMERGENCY TERMINAL DECELERATION IN ELEVATOR SYSTEMS

(71) Applicant: Otis Elevator Company, Farmington, CT (US)

(72) Inventor: Uwe Schönauer, Berlin (DE)

(73) Assignee: OTIS ELEVATOR COMPANY, Farmington, CT (US)

( * ) Notice: Subject to any disclaimer, the term of this patent is extended or adjusted under 35 U.S.C. 154(b) by 1235 days.

(21) Appl. No.: 17/397,237

(22) Filed: Aug. 9, 2021

(65) Prior Publication Data

US 2022/0177264 A1 Jun. 9, 2022

(30) Foreign Application Priority Data

Dec. 4, 2020 (EP) .................................... 20212048

(51) Int. Cl.
*B66B 1/00* (2006.01)
*B66B 1/32* (2006.01)
*B66B 5/02* (2006.01)

(52) U.S. Cl.
CPC . *B66B 1/32* (2013.01); *B66B 5/02* (2013.01)

(58) Field of Classification Search
CPC .................................... B66B 1/32; B66B 5/02
USPC .......................................................... 187/247
See application file for complete search history.

(56) References Cited

U.S. PATENT DOCUMENTS 5,637,841 A 6/1997 Dugan et al.
6,032,761 A 3/2000 Coste et al.
6,082,498 A 7/2000 Coste et al.
6,701,277 B2 3/2004 Coste et al.
7,597,176 B2 10/2009 Zaharia
8,205,721 B2 6/2012 Korhonen et al.
8,459,415 B2 6/2013 Kwon et al.
9,296,591 B2 3/2016 Garfinkel et al.
10,124,987 B2 11/2018 Shibata et al.
2010/0258382 A1* 10/2010 Kondo ...................... B66B 1/32
187/288

(Continued)

FOREIGN PATENT DOCUMENTS

CN 204751762 U 11/2015
CN 111532927 A 8/2020

(Continued)

OTHER PUBLICATIONS

European Search Report for Application No. 20212048.1; Issued May 21, 2021; 7 Pages.

*Primary Examiner* — Erick D Glass
(74) *Attorney, Agent, or Firm* — CANTOR COLBURN LLP

(57) ABSTRACT

A method of controlling a moving component (22, 24) approaching a buffer (42, 46) in a hoistway (34) of an elevator system (20) is provided. The method includes: a) calculating, based on a current velocity of the moving component (22, 24), a required braking distance to decelerate the moving component (22, 24) to a maximum buffer impact velocity; b) comparing the required braking distance to a current buffer distance between the moving component (22, 24) and the buffer (42, 46) to give a comparison result; c) repeating steps a) and b) one or more times; and d) triggering an emergency stop of the moving component (22, 24) based on the comparison result.

15 Claims, 4 Drawing Sheets

(56) References Cited

U.S. PATENT DOCUMENTS

| | | | | |
|---|---|---|---|---|
| 2011/0011681 | A1* | 1/2011 | Kondo | B66B 1/32 187/247 |
| 2013/0264149 | A1* | 10/2013 | Okamoto | B66B 5/06 187/247 |
| 2017/0217724 | A1* | 8/2017 | Shibata | B66B 5/06 |

FOREIGN PATENT DOCUMENTS

| | | | |
|---|---|---|---|
| EP | 0380802 | B1 | 3/1994 |
| EP | 2221267 | B1 | 5/2015 |
| EP | 2695841 | B1 | 1/2016 |
| EP | 3287403 | A1 | 2/2018 |
| EP | 2289832 | B1 | 10/2018 |
| EP | 3599200 | A1 | 1/2020 |
| EP | 2627595 | B1 | 10/2021 |
| GB | 1573545 | A | 8/1980 |
| KR | 920008388 | B1 | 9/1992 |
| WO | 2016157369 | A1 | 7/2017 |
| WO | 2020003356 | A1 | 1/2020 |

* cited by examiner

EMERGENCY TERMINAL DECELERATION IN ELEVATOR SYSTEMS

FOREIGN PRIORITY

This application claims priority to European Patent Application No. 20212048.1, filed Dec. 4, 2020, and all the benefits accruing therefrom under 35 U.S.C. § 119, the contents of which in its entirety are herein incorporated by reference.

TECHNICAL FIELD

The present disclosure relates to elevator systems and methods for operating elevator systems. In particular, the present disclosure relates to methods of controlling a moving component approaching a buffer in a hoistway of an elevator system.

BACKGROUND

Elevator systems typically comprise an elevator car and counterweight that run in a hoistway to transport passengers or cargo between floors of a building. For safety reasons, buffers are normally provided at the bottom of the hoistway to act as a shock absorber and bring the elevator car quickly but gently to a halt if it should overrun a terminal landing (e.g. the lowermost floor).

The maximum velocity of impact an elevator buffer can safely withstand can sometimes restrict the operation of the rest of the elevator system. For instance, safety regulations may prohibit the operation of elevator cars at velocities above the rated impact velocity of the buffer unless additional safety measures are implemented. However, buffers rated for high impact velocities can be expensive and take up a lot of room in the hoistway. Additional safety measures, such as an emergency terminal stopping device (ETSD) made up of safety chain switches at fixed points in the hoistway, can allow higher velocities to be used but require additional hardware in the hoistway. Conventional ETSDs are also limited to checking the velocity of the elevator at discrete fixed points near the terminal landing, e.g. when the car travels past discrete position switches. An alternative approach may be desired.

SUMMARY

According to a first aspect of the present disclosure, there is provided a method of controlling a moving component approaching a buffer in a hoistway of an elevator system, the method comprising: calculating, based on a current velocity of the moving component, a required braking distance to decelerate the moving component to a maximum buffer impact velocity; comparing the required braking distance to a current buffer distance between the moving component and the buffer to give a comparison result; repeating steps a) and b) one or more times; and triggering an emergency stop of the moving component based on the comparison result.

According to a second aspect of the present disclosure, there is provided an elevator system comprising: a moving component arranged to move along a hoistway; a buffer located in the hoistway to limit the movement of the moving component; and a controller configured to: calculate, based on a current velocity of the moving component, a required braking distance to decelerate the moving component to a maximum buffer impact velocity; compare the required braking distance to a current buffer distance between the moving component and the buffer to give a comparison result; repeat steps a) and b) one or more times; and trigger an emergency stop of the moving component based on the comparison result.

Thus, an emergency stop of the moving component (e.g. an elevator car or an elevator counterweight) is triggered if the moving component is travelling too quickly when approaching the buffer (i.e. if the moving component would otherwise impact the buffer with a velocity above the maximum buffer impact velocity). Because the required braking distance is repeatedly calculated based on the current velocity of the moving component, a pre-calculated look-up table (e.g. defining a pre-calculated velocity envelope) is not required, saving on memory required by the controller. Furthermore, because the required braking distance is specifically calculated based on the current velocity (i.e. an analytical calculation), smaller safety margins may be needed compared to traditional methods involving fixed velocity thresholds at fixed points in the hoistway, because these fixed thresholds must include large safety margins to reduce the likelihood that the component reaches an unacceptable velocity between the fixed points. This may allow the elevator system to be operated at higher velocities and/or with more aggressive deceleration profiles. In some examples the moving component e.g. elevator car can be operated at a higher velocity than the maximum buffer impact velocity during normal operation.

In some examples an emergency stop is triggered if a single comparison result indicates that the current buffer distance is less than the required braking distance. However, in some examples, multiple comparison results may be taken into account when triggering an emergency stop. For instance, an emergency stop may be triggered if multiple successive or near-successive comparison results indicate that the current buffer distance is less than the required braking distance (e.g. if a certain proportion of recent comparison results indicate that the current buffer distance is less than the required braking distance). In some examples, an emergency stop may be triggered based on an average of several comparison results (e.g. if a rolling average of several comparison results indicates that the current buffer distance is less than the required braking distance). Taking multiple comparison results into account may help to avoid at least some unnecessary emergency stops (e.g. that may have otherwise been triggered by a single anomalous comparison result e.g. caused by noise).

Triggering an emergency stop typically involves interrupting a power supply to a drive device (e.g. a motor) arranged to drive the moving component in the hoistway and to a brake device arranged to decelerate the moving component. The drive and brake devices may both be provided as part of a drive system or drive machine, for instance where the drive device is arranged to rotate a drive sheave around which a tension member connected to the moving component(s) passes, and the brake device is arranged to apply braking force to the drive sheave. In some examples, interrupting the power supply to the drive and brake devices stops any driving force being applied to the moving component and applies the brakes, thus bringing the moving component quickly to a halt.

In some examples, steps a) and b) may be repeated a plurality of times, e.g. throughout at least a portion of a journey taken by the moving component. In various examples, the method repeats steps a) and b) frequently so as to dynamically update the required braking distance, at least when the moving component is approaching the buffer. For instance, steps a) and b) may be repeated throughout a portion of a journey for which the current buffer distance between the moving component and the buffer is less than a pre-set value. More generally, in some examples, steps a) and b) may be repeated a plurality of times when the current buffer distance between the moving component and the buffer is less than a pre-set value, e.g. less than 5 m. This may provide continuous monitoring when the moving component is approaching the buffer (whether as part of a planned journey or otherwise). Because the method does not rely on discrete sensors installed at fixed positions in the hoistway, the region of the hoistway and/or the portion of the elevator journey that is monitored can be selected more easily than traditional approaches.

The one or more repetitions of steps a) and b) may be separated, for instance, by less than one second. In some examples, steps a) and b) repeat with a separation of 500 ms or less, 100 ms or less, 50 ms or less, or even up to 10 ms or less. In some examples, the repetition rate is preset. The repetition rate may be chosen based on one or more factors such as the operating velocity of the moving component. The repetition rate may be unchanging although it could vary (e.g. based on a position of the moving component relative to the buffer, for instance repeating more regularly when the moving component is closer to the buffer). Steps and b) may repeat at different rates.

In some examples, step a), and optionally step b), are repeated based on an updated current velocity (e.g. when an updated current velocity is provided). For instance, the repetition rate may depend on a rate of current velocity measurements. Step a) and optionally step b) may be repeated whenever a new measurement of the current velocity of the moving component is made, or at a rate based on (e.g. proportional to) a measurement rate of the current velocity (e.g. steps a) and b) may be performed each time an absolute position measurement system provides an updated velocity measurement). In other words, steps a) and b) may be repeated to update the comparison result dynamically based on a measurement of the current velocity of the moving component. It will be understood that in some such examples velocity updates may be provided at a higher rate when the car is moving faster.

In some examples, calculating the required braking distance to decelerate the moving component to a maximum buffer impact velocity comprises calculating the motion of the moving component following an emergency stop condition being met. For instance, the required braking distance may be calculated by predicting motion of the moving component in different phases of an emergency stop. The required braking distance may be calculated using expected constant accelerations of the moving component in the different phases.

In some examples, calculating the motion of the moving component comprises calculating a first distance that would be travelled by the moving component in a first phase of an emergency stop. The first phase may comprise a reaction time (e.g. an electronic signal delay or computing delay) between an emergency stop condition being met and one or more emergency stop actions (e.g. the interruption of a power supply to a brake device and/or a drive device) occurring. The reaction time may be predetermined (e.g. defined as part of the specification for the type of elevator system in use or based on measurements of the reaction time for the particular elevator system in use). For example, the reaction time may relate to the time taken for an emergency stop signal from the controller to reach the drive and brake devices. Calculating the first distance may comprise assuming the moving component accelerates at an expected constant first acceleration in the first phase. In one set of examples, the first distance travelled by the moving component, $ds_1$, may be calculated according to:

$$ds_1 = v_{current} dt_{rection} + \tfrac{1}{2} a_1 dt_{reaction}^2,$$

where $v_{current}$ is the current velocity of the moving component (i.e. at the time the emergency stop condition is met), $dt_{reaction}$ is the reaction time between an emergency stop condition being met and one or more emergency stop actions occurring and $a_1$ is the expected first acceleration during the first phase of the emergency stop.

The expected first acceleration during the first phase of the emergency stop may comprise a fixed, predetermined value, for instance a reasonable "worst-case" acceleration value (e.g. the acceleration that would be experienced by the moving component if maximum normal driving force were to be applied by a drive system). This approach reduces the likelihood of the first distance being underestimated, e.g. even if a drive system were to malfunction and apply full driving force at an unintended time.

Additionally or alternatively, the expected first acceleration may be determined based on a measured acceleration of the moving component immediately before the required braking distance is calculated. This can produce a more accurate first distance (as it is likely that the acceleration during the reaction time will be at least approximately consistent with that immediately before the emergency stop condition is met), allowing for tighter operational margins and thus more efficient operation of the elevator system. For instance, the expected first acceleration may be taken to be equal to a measured acceleration of the moving component immediately before the required braking distance calculated, or calculated relative to a measured acceleration of the moving component immediately before the required braking distance is calculated (e.g. with a predetermined tolerance such as 10% or 20% added to the measured acceleration). In some examples, the expected first acceleration may be determined based on a planned acceleration of the elevator car (i.e. according to the route the elevator car is currently taking).

In some examples, additionally or alternatively, calculating the motion of the moving component may comprise calculating a second distance travelled by the moving component in a second phase of an emergency stop. The second phase may comprise a brake drop delay time—i.e. the time between an emergency stop action occurring (e.g. the interruption of a brake device power supply) and a substantive braking force being generated (e.g. a certain level of nominal maximum braking force such as 70%, 80% or 90%), i.e. the time it takes a brake device to physically engage. The brake drop delay may be predefined (e.g. as part of the elevator system's specification), or it may be measured from previous braking operations. Calculating the second distance may comprise assuming the moving component accelerates at a constant expected second acceleration in the second phase. In some sets of examples, the second distance travelled by the moving component, $ds_2$, may be calculated according to:

$$ds_2 = v_1 dt_{delay} + \tfrac{1}{2} a_2 dt_{delay}, \tag{2}$$

where $dt_{delay}$ is the brake drop delay, $a_2$ is the expected second acceleration during the second phase of the emergency stop and $v_1$ is the expected velocity of the moving component at the start of the second phase, calculated according to:

$$v_1 = v_{current} + a_1 dt_{reaction} \tag{3}$$

The expected second acceleration during the second phase of the emergency stop may comprise a fixed, predetermined value, for instance a free-roll acceleration value experienced by the moving component when no drive force or braking force is applied thereto (i.e. because the emergency stop interrupts a power supply to drive and brake devices). The expected second acceleration may comprise a combination (e.g. an average) of possible accelerations (e.g. a free-roll acceleration value, a partial braking force acceleration value or a full braking force acceleration value).

In some examples, additionally or alternatively, calculating the motion of the moving component may comprise calculating a third distance travelled by the moving component in a third phase of an emergency stop. The third phase may comprise a braking time between the substantive braking force being generated and the moving component being decelerated to the maximum buffer impact velocity. Calculating the second distance may comprise assuming the moving component accelerates at a constant expected third acceleration in the third phase. In one set of examples, the third distance travelled by the moving component, $ds_3$, may be calculated according to:

$$ds_3=v_2dt_{breaking}+\tfrac{1}{2}a_3dr_{braking}^2, \tag{4}$$

Where $a_3$ is the expected third acceleration during the second phase of the emergency stop, $v_2$ is the expected velocity of the moving component at the start of the third phase and $dt_{braking}$ is the braking time, calculated according to:

$$v_2 = v_1 + a_2dt_{delay}, \tag{5}$$

$$dt_{braking} = \frac{a_2 - v_{buf}}{a_3} \tag{6}$$

where $v_{buf}$ is the maximum buffer impact velocity.

The expected third acceleration during the third phase of the emergency stop may comprise a fixed, predetermined value, for instance based on an expected emergency stop braking force (e.g. a nominal maximum braking force specified by a brake device) and an expected mass of the moving component.

The actual motion of the moving component (e.g. the first, second and/or third accelerations) during the emergency stop also depends upon the mass of the and configuration of the moving component along with any other connected components (e.g. the motion of an elevator car coupled to a counterweight by a tension member depends upon the mass of all three components). In some examples calculating the motion of the moving component comprises using the mass and/or configuration of the moving component. For instance, a heavily-loaded elevator car travelling downwards will decelerate more slowly than a lightly-loaded elevator car when subject to the same braking force. Similarly, an elevator car coupled to a counterweight by a tension member may decelerate more quickly when travelling downwards near to the bottom of a hoistway than when travelling upwards near the top of a hoistway for the same braking force (due to uneven distribution of the mass of the tension member).

In some examples normal operational changes in the mass and/or configuration of the moving component (e.g. caused by changes in passenger or cargo load level, or by the movement of the moving component relative to other coupled components in the hoistway) may have only a small or negligible impact on the accelerations experienced by the moving component (e.g. if the moving component has a small load capacity relative to its empty weight). In such examples a sufficiently accurate calculation may be performed by simply assuming the mass and/or configuration of the moving component to be constant (e.g. assuming the mass is equal to an average or half-loaded mass).

However, in other examples normal operational changes in mass and/or configuration may have a meaningful impact on the motion of the moving component. In some examples, calculating the motion of the moving component may comprise assuming a worst-case mass and/or configuration situation (i.e. in which the first, second and/or third accelerations are highest). For instance, the mass of the component may be assumed to be a fully-loaded mass, and/or the configuration of the moving component and other coupled components may be assumed to be highly imbalanced (e.g. an empty elevator car at the top of the hoistway or a fully-loaded elevator car down at the hoistway bottom).

In some examples, additionally or alternatively, a mass and/or configuration of the moving component (and optionally one or more components coupled to the moving component) may be measured or estimated and used when calculating the required braking distance. For instance, the mass of the moving component may be measured directly (e.g. by a load sensor mounted at the drive device) or a number of passengers and/or mass of cargo carried by the moving component may be measured or estimated and used to estimate the mass of the moving component (e.g. by a load sensor mounted at the moving component).

In some sets of examples, the required braking distance may include an additional tolerance such as a fractional tolerance (e.g. of 1%, 5%, 10%, 20% or more) or an absolute tolerance (e.g. of 0.01 m, 0.05 m, 0.1 m, 0.2 m or more). This may ensure safe operation even if there are, for instance, measurement errors, communication latencies and/or operational variations in the behaviour of the moving component.

In various examples, the current velocity of the moving component and/or the current buffer distance may be determined by one or more measurement systems. For example, the current velocity of the moving component may be measured by a velocity transducer mounted to the drive device that is arranged to drive the moving component in the hoistway, e.g. the rotational velocity of a drive shaft in the drive device can be converted to the current velocity of the moving component. For example, the current position of the moving component, and hence the current buffer distance, may be measured by a position transducer mounted to a rotary encoder device that is driven by a member coupled to the moving component. In some other examples, the current buffer distance may be measured by a sensor mounted to the moving component and arranged to directly measure the distance to the buffer, e.g. from a reflected light signal or the like. Such transducer-based systems can provide near continuous measurement of velocity and position.

The methods disclosed herein are particularly applicable to elevator systems wherein the absolute position and/or velocity of a moving component is being measured precisely by a dedicated system. In some examples, additionally or alternatively, the current velocity of the moving component and/or the current buffer distance may be determined using an absolute velocity and/or position of the moving component in the hoistway. For instance, the current buffer distance may be determined by comparing a known buffer position in the hoistway to the absolute position of the moving component in the hoistway. In at least some examples the elevator system comprises an absolute position measurement system arranged to determine the absolute position and/or velocity of the moving component. The absolute position measurement system may be configured to output directly the current buffer distance (i.e. configured to take a buffer position into account), so that no additional calculation is required. In at least some examples, the absolute position measurement system may be an absolute position reference system comprising a position reference tape (such as a coded tape) extending at least part of the way along the hoistway (e.g. in at least a portion of the hoistway near the terminal landing) and one or more sensors mounted on the moving component and arranged to read the position reference tape to determine the position of the moving component in the hoistway. The current velocity may also be calculated from the change in position measured by the absolute position reference system.

The elevator system may comprise one or more controllers arranged to perform one or more of steps a) to d). The controller may comprise a PESSRAL node, i.e. a node defined as a Programmable Electronic System in Safety Related Applications for Lifts according to the relevant standard(s). The controller may comprise a decision module arranged to perform steps a) and b), and an actuator module arranged to perform step d). The decision and actuator modules may be connected by a CAN (Controller Area Network) bus.

The controller may comprise a dedicated safety controller, but in some examples the controller may comprise an elevator controller, i.e. that is also configured to control movement of the moving component in normal operation (e.g. to control an elevator car to respond to elevator calls). The controller may be provided as part of another device (e.g. a remote monitoring device). In some examples, the controller may receive (e.g. over a CAN bus) information regarding an absolute position and/or current buffer distance and/or velocity of the moving component, e.g. from a separate absolute positioning system. Additionally or alternatively, the controller may be arranged to measure directly the absolute position and/or current buffer distance and/or velocity of the moving component.

In some examples, additionally or alternatively, the controller comprises a memory configured to store the expected constant acceleration parameters discussed above, such as the reaction time, the brake drop delay time, and the braking time. The mass of the moving component may also be stored as a parameter, whether this is preset or measured and dynamically updated. The memory may also be used to temporarily store the current velocity and/or current buffer distance, e.g. from the latest measurement or a small number of recent measurements.

Features of any aspect or example described herein may, wherever appropriate, be applied to any other aspect or example described herein. Where reference is made to different examples, it should be understood that these are not necessarily distinct but may overlap.

BRIEF DESCRIPTION OF THE DRAWINGS

One or more non-limiting examples will now be described, by way of example only, and with reference to the accompanying figures in which.

DETAILED DESCRIPTION

Figure 1:
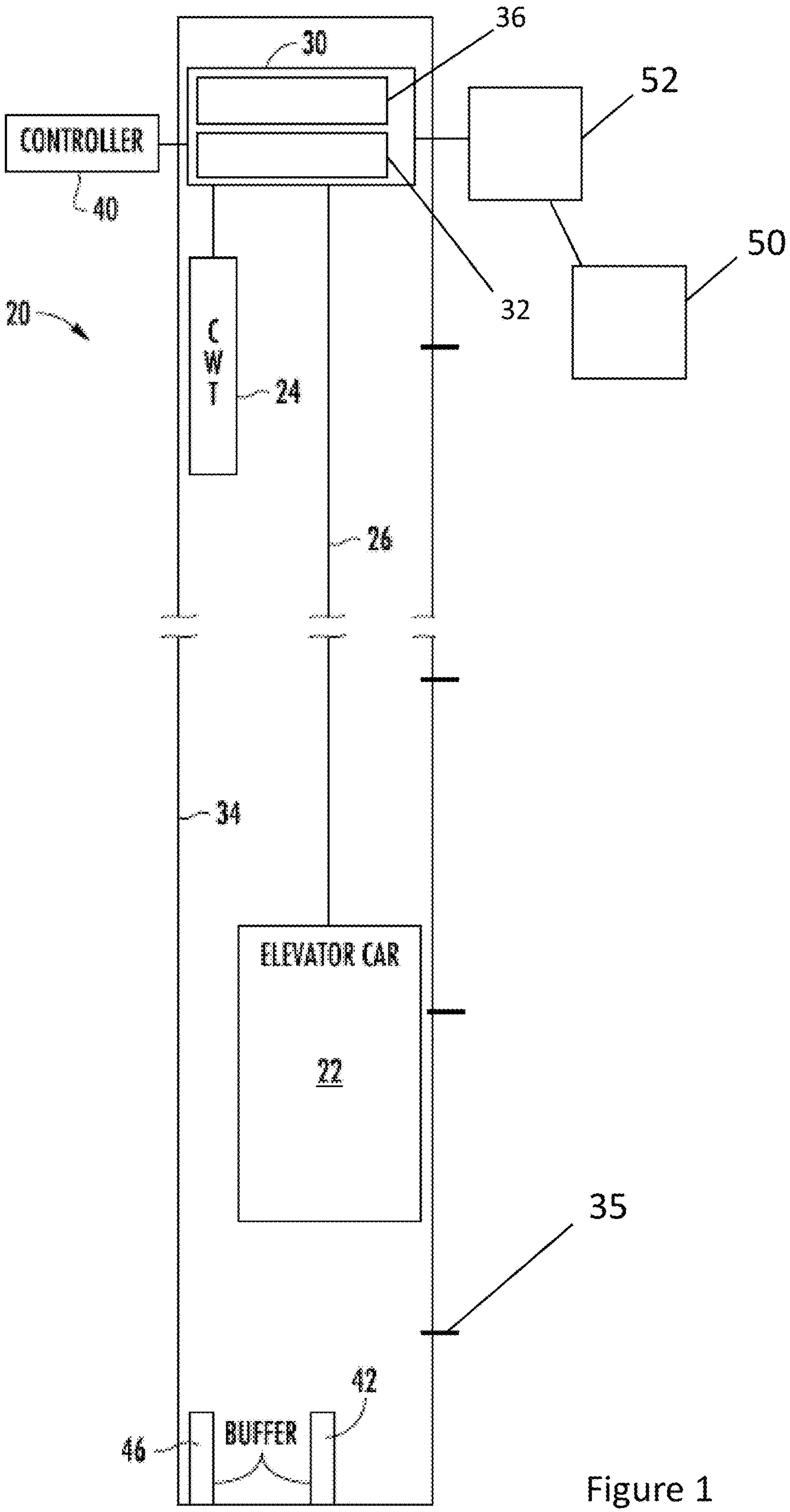
FIG. 1 is a schematic view of an elevator system according to an example of the present disclosure.

As shown in FIG. 1, an elevator system 20 comprises an elevator car 22 that runs in a hoistway 34 between various floors of a building. The elevator car 22 is suspended in the hoistway 34 by a tension member 26 (e.g. one or more ropes or belts). The other end of the tension member 26 is connected to a counterweight 24. The elevator car 22 and the counterweight 24 are moving components in the elevator system 20. However, it will be appreciated that in other examples the elevator system may be ropeless.

The bottom of the hoistway 34 includes a first buffer 42 located underneath the elevator car 22 and a second buffer 46 located underneath the counterweight 24. The buffers 42, 46 are located just below a terminal landing 35 of the elevator system 20 (i.e. stopping point for the lowermost floor in the building) and are arranged to act as shock absorbers to bring the elevator car 22 and/or counterweight 24 quickly but gently to a halt if it should overrun the terminal landing 35. The buffers 42, 46 are designed to safely withstand an impact from the elevator car 22 or counterweight 24 respectively at or below a maximum buffer impact velocity. The first and second buffers 42, 46 may have different maximum buffer impact velocities. In one example, the maximum buffer impact velocity for the first buffer 42 (i.e. the buffer for the elevator car 22) is approximately 1 $ms^{-1}$.

During normal operation, the elevator car 22 travels up and down in the hoistway to transport passengers and/or cargo between floors of the building. The elevator car 22 is driven by a drive system 30 comprising a drive device 32 and a brake device 36. The tension member 26 passes over a drive sheave (not shown) that is driven to rotate by the drive device 32 and braked by the brake device 36. Normal operation of the drive system 30 is controlled by an elevator controller 40. In some examples, during normal operation the elevator car 22 is driven to travel at velocities exceeding the maximum buffer impact velocity for the first buffer 42 (e.g. at velocities of up to 4 $ms^{-1}$ or more).

Figure 2:
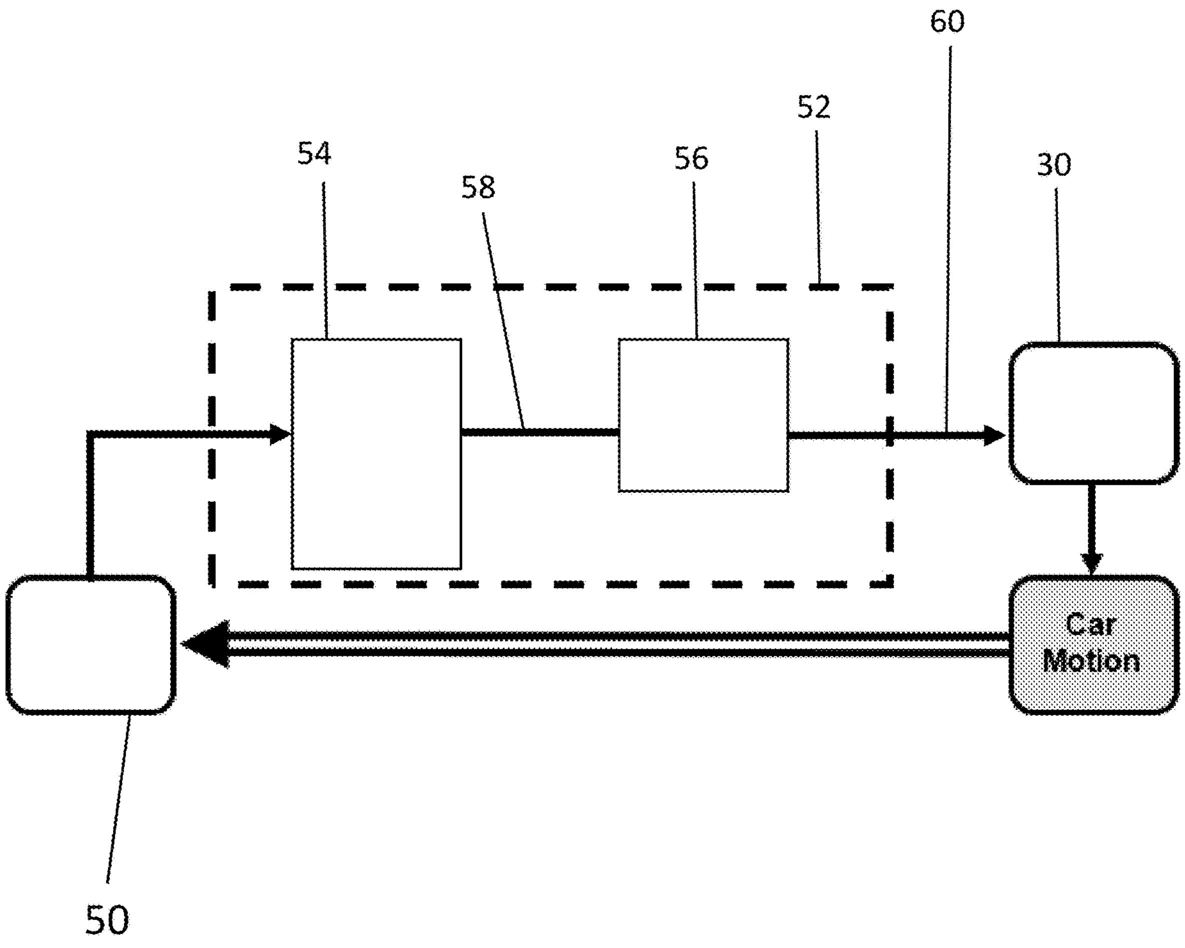
FIG. 2 is a schematic diagram illustrating the operation of the of the elevator system in FIG. 1.

The elevator system 20 also comprises a safety controller 52, shown in more detail in FIG. 2. The safety controller comprises 52 comprises an ETS (Emergency Terminal Stop) decision node 54 and an actuator node 56, connected by a CAN bus 58. If required, the actuator node 56 can interrupt the supply of power to the drive system 30 to execute an emergency stop via a safety chain 60.

The elevator system 20 also comprises an absolute position measurement system 50 configured to determine the absolute position and velocity of the elevator car 22 in the hoistway 34. The absolute position measurement system 50 is configured to output a measurement of the absolute position and velocity of the elevator car 22 at a high rate (e.g. up to every 10 ms or faster) to the safety controller 52 over CAN bus 58. Although the absolute position measurement system 50 is shown as a separate component in FIGS. 1 and 2, in some examples it may form part of the safety controller 52 or the elevator controller 40 (or all three could be provided as one controller). The absolute position measurement system 50 comprises a coded tape extending at least part of the way along the hoistway (not shown) and two sensors (not shown) mounted on the elevator car 22 and arranged to read the coded tape to determine the position and velocity of the elevator car 22 in the hoistway 34.

At any point during normal operation an emergency stop of the elevator car 22 may be triggered, for instance if a hoistway door is opened, if a maintenance worker is present in the pit of the hoistway or, as explained in more detail below, the elevator car 22 travels too quickly on approach to the terminal landing 35. An emergency stop is triggered by an emergency stop signal from the safety chain 60 seen in FIG. 2. An emergency stop may be executed by interrupting the supply of power to the drive system 30. The loss of power triggers the brake device 36 to engage and stops the drive device 32 (i.e. removes any drive torque applied to the drive sheave). This brings the elevator car 22 (and the counterweight 24) quickly to a halt.

Figure 3:
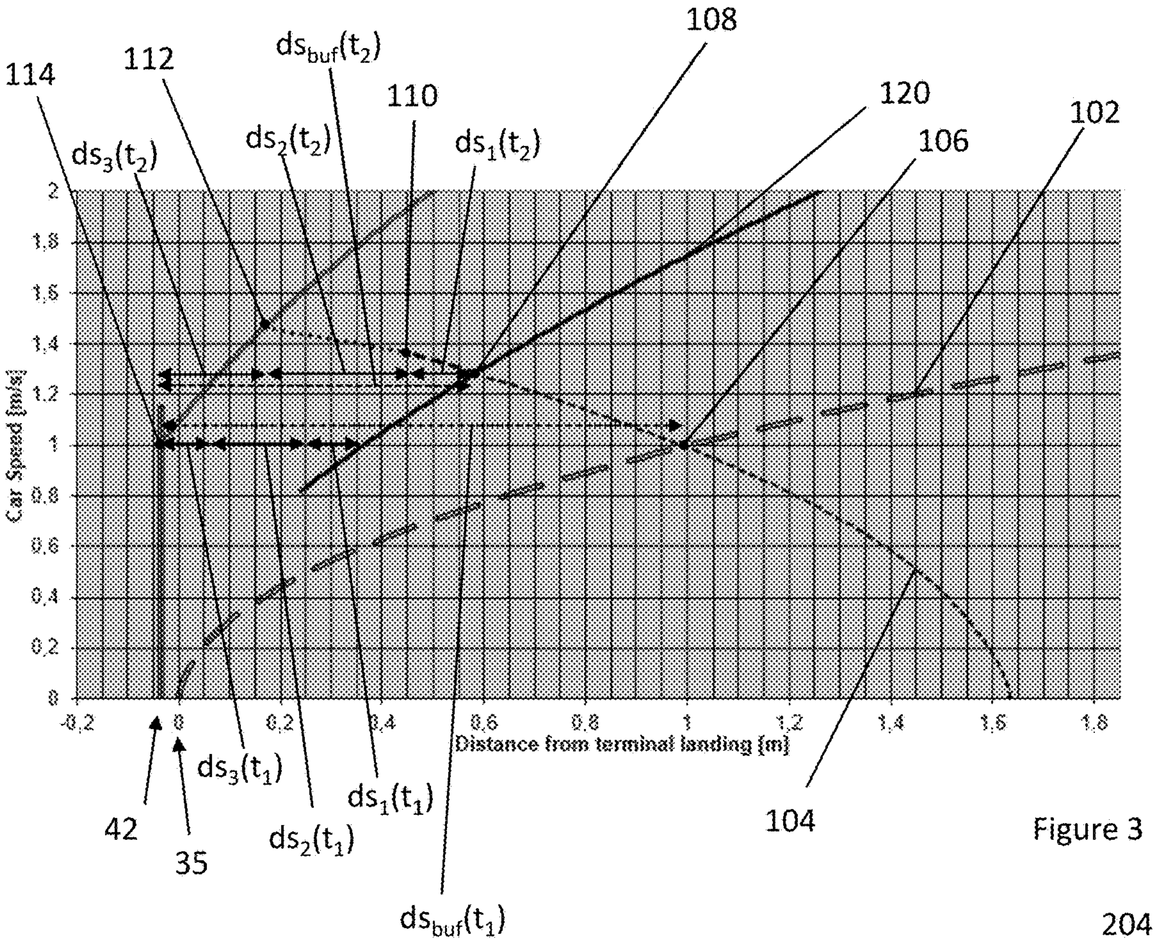
FIG. 3 is a speed-distance diagram illustrating trajectories of an elevator car operated according to an example of the present disclosure.

FIG. 3 is a speed-position diagram illustrating the normal trajectory 102 of the elevator car 22 approaching the terminal landing 35, and an improper trajectory 104 of the elevator car 22 approaching the terminal landing 35 too quickly, such that an emergency stop is triggered.

The normal trajectory 102 shows the elevator car 22 gradually slowing to a halt at the position of the terminal landing 35 (roughly 0.05 m above the buffer 42). The improper trajectory 104 shows the elevator car 22 accelerating towards the terminal landing 35.

For both trajectories 102, 104, the absolute position measurement system 50 continuously (e.g. at a high rate of up to every 10 ms or less) measures the position and velocity of the elevator car 22, and the ETS decision node 54 of the safety controller 52 repeatedly (e.g. at the same rate of the absolute position measurement system 50) calculates a required braking distance to decelerate the elevator car 22 to the maximum buffer impact velocity (1 $ms^{-1}$ in this example) using the current velocity of the elevator car 22.

For instance, at point 106, at time $t_1$, the elevator car 22 of both trajectories 102, 104 is located 1 m above the terminal landing 35 (i.e. with a current buffer distance dsbuf (t1) of approximately 1.05 m) and is travelling at 1 $ms^{-1}$. The required braking distance at this moment is calculated by summing the distances that would be travelled by the elevator car 22 in three phases of an emergency stop: a first distance $ds_1$ ($t_1$) corresponding to the distance that would be travelled by the elevator car 22 during a reaction time dtreaction between an emergency stop condition being met at $t_1$ and the interruption of the power supply to the drive system 30; a second distance $ds_2$ ($t_1$), corresponding to the distance that would be travelled by the elevator car 22 during a brake drop delay time dtdelay between the interruption of power to the brake device 36 and the generation of substantive braking force by the brake device 36 (e.g. 80% of nominal maximum braking force); and a third distance $ds_3(t_1)$, corresponding to the distance that would be travelled by the elevator car 22 whilst it decelerates under braking to the maximum buffer impact velocity, for a time dtbraking. The first distance $ds_1(t_1)$ is calculated according to equation (1) given above where, for this example, at time $t_1$:

$$v_{current}=1\ ms^{-1},$$

$$dt_{reaction}=100\ ms,$$

$$a_1=1\ ms^{-2}$$

Giving a value for $ds_1$ of approximately 0.105 m. Similarly, the second and third distances are calculated according to equations (2)-(6), and summed to produce the total required braking distance, which in this example at time $t_1$ is approximately 0.4 m. However, because the current buffer distance $ds_{bu}f$ ($t_1$) is 1.05 m, no emergency stop is triggered for either trajectory 102, 104.

Figure 4:
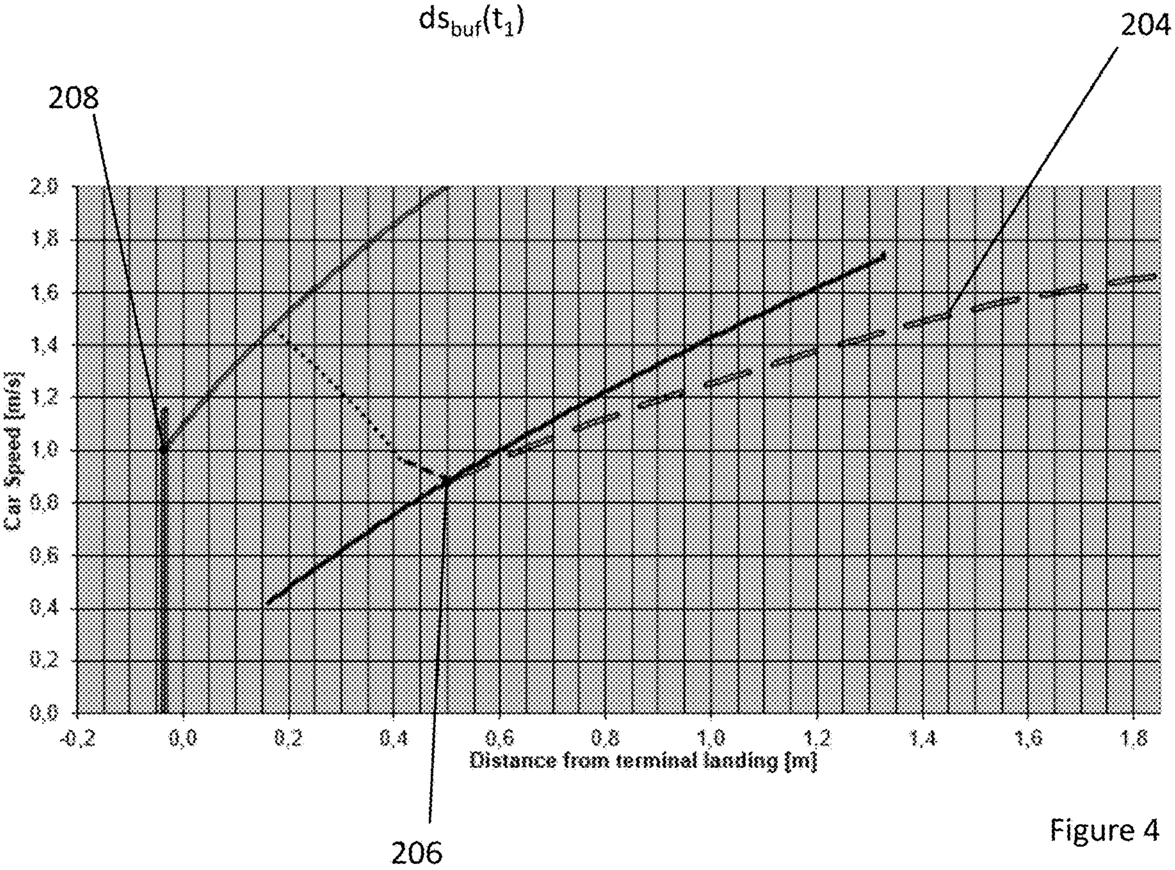
FIG. 4 is a speed-distance diagram illustrating another trajectory of an elevator car operated according to an example of the present disclosure.

However, at a second time, $t_2$, the elevator car 22 following the improper trajectory 104 is at point 108 in FIG. 4, roughly 0.6 m above the terminal landing (i.e. with $ds_{buf}$ ($t_2$)=0.605 m) and travelling at roughly 1.2 $ms^{-1}$. Again, first, second and third distances $ds_1$ ($t_2$), $ds_2$ ($t_2$), $ds_3$ ($t_3$) are calculated and the total required braking distance calculated to be 0.605 m. Thus, an emergency stop is triggered by the actuator node 56 of the safety controller 52, cutting power to the drive system 30 and thus decelerating the elevator car 22 to below the maximum buffer impact velocity of 1 $ms^{-1}$ before the elevator car 22 hits the buffer 42. The emergency stop follows the three expected phases, with the elevator car 22 accelerating to point 110 in a first phase during a reaction time, accelerating further to point 112 in a brake drop delay time and decelerating for a braking time to point 114 (where it hits the buffer 42).

For illustrative purposes, FIG. 3 shows a required braking distance 120 for a range of car velocities. However, this velocity envelope is not pre-stored by the safety controller 52 (e.g. as a look-up table) and used to trigger emergency stops, because this requires additional memory (to store the look-up table) and is more difficult to adapt to changing circumstances (e.g. a changing elevator car 22 mass). Instead, the ETS Decision node 54 simply stores a small number of parameters (e.g. maximum buffer impact velocity, terminal buffer position) and calculates analytically the required braking distance repeatedly at a high rate (e.g. up to every 10 ms or even faster) as the elevator car 22 descends towards the terminal landing 35.

FIG. 4 shows another improper trajectory 204 of the elevator car 22. It can be seen that although the elevator car 22 is decelerating towards the terminal it is doing so too slowly. At a point 206, the elevator car 22 has a current buffer distance of 0.5 m, and a current velocity of approximately 0.9 $ms^{-1}$. Using the current velocity, the safety controller 52 calculates the required braking distance to be 0.5 m and thus triggers an emergency stop which brings the elevator car 22 to below the maximum buffer impact velocity before the elevator car 22 hits the buffer 42 at point 208.

Figure 5:
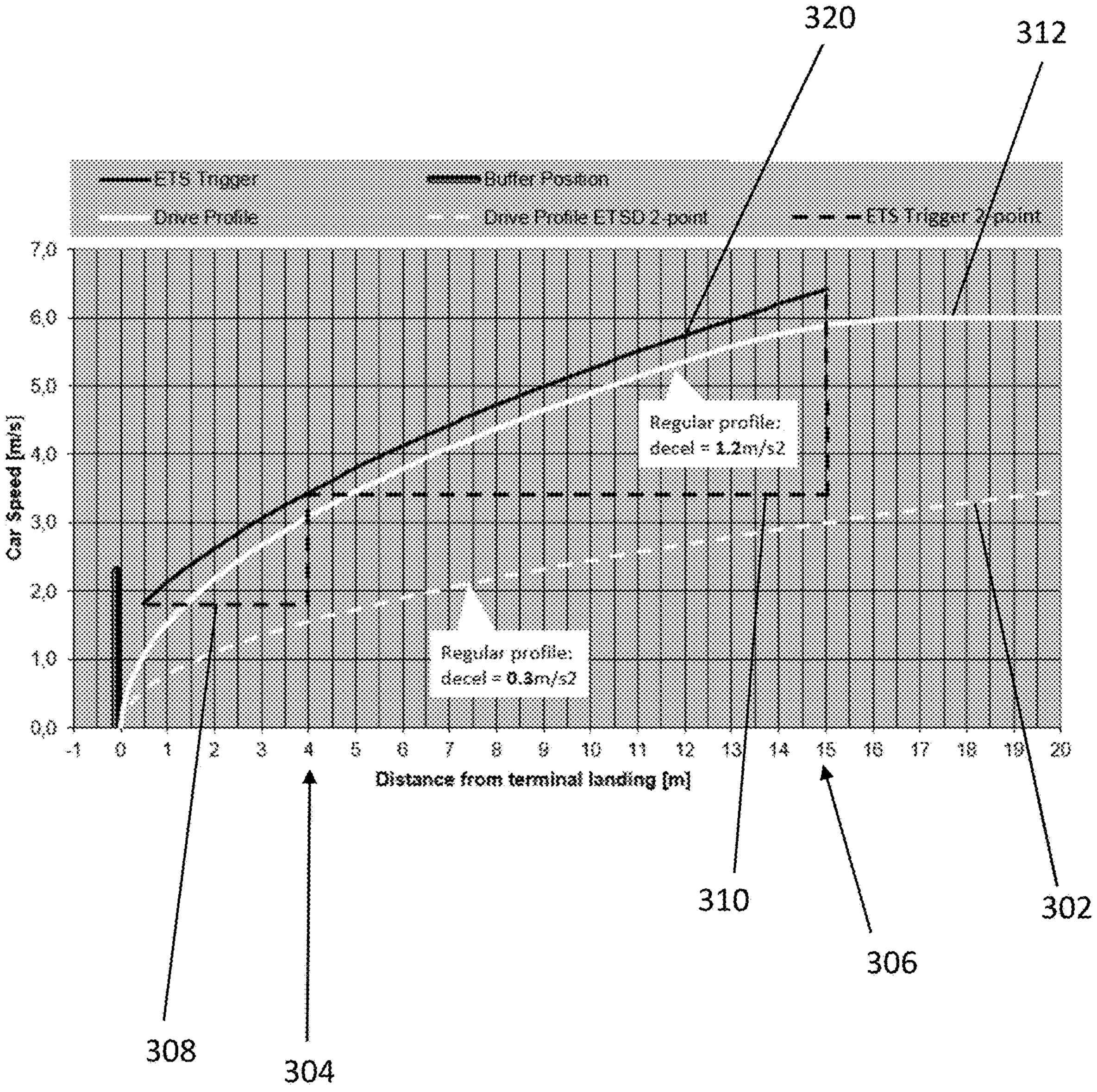
FIG. 5 is a speed-distance diagram illustrating a comparison between the trajectory of an elevator car operated conventionally, and an elevator car operated according to an example of the present disclosure.

FIG. 5 compares a possible trajectory of an elevator car approaching a terminal landing according to a conventional emergency terminal stop method, and according to an example of the present disclosure.

FIG. 5 shows a regular operational profile ("Drive Profile ETSD 2-point") 302 (i.e. trajectory) for an elevator car in a system which uses a conventional emergency terminal stopping device featuring two discrete position switches 304, 306 located at 4 m and 15 m from the terminal landing (0 m) respectively. The position switches 304, 306 are arranged to trigger an emergency stop if the elevator car passes by travelling at a velocity above pre-set thresholds 308, 310 of 1.9 $ms^{-1}$ and 3.4 $ms^{-1}$ respectively. The dotted line connecting the pre-set thresholds 308, 310 represents the fixed velocity threshold applied across different travel distances in the hoistway.

Because, in the conventional system, emergency terminal stops can only be triggered by the discrete position switches 304, 306, the velocity threshold 310 for the upper position switch 306 must be set at a velocity it is safe for the elevator car to be travelling just prior to passing the lower position switch 304 (because the system receives no position information between these two points). This means that a large safety margin is included in the velocity threshold 310 (i.e.

it must be set below what is actually safe at the position of the upper position switch 306). Similarly, the threshold for the lower position switch 304 also includes a large safety margin. The deceleration profile of the elevator car following the regular operational profile 302 must therefore be very gentle, in this example having a deceleration of approximately 0.3 $ms^{-2}$.

In contrast, FIG. 5 also shows a regular operational profile ("Drive Profile") 312 (i.e. trajectory) of an elevator car controlled according to an example of the present disclosure. In this example, the required braking distance is repeatedly calculated based on the current velocity of the elevator car and compared to the current buffer distance of the car. The calculated required braking distance ("ETS Trigger") 320 for a range of car velocities is shown in FIG. 5 and illustrates the benefit of this continuous monitoring. The regular motion profile 312 does not need to include large safety margins and thus may be more aggressive, i.e. featuring higher velocities and a higher deceleration (1.2 $ms^{-2}$ in this example) than the prior art approach. This allows for more efficient elevator operation (e.g. with shorter journey times).

While the disclosure has been described in detail in connection with only a limited number of examples, it should be readily understood that the disclosure is not limited to such disclosed examples. Rather, the disclosure can be modified to incorporate any number of variations, alterations, substitutions or equivalent arrangements not heretofore described, but which are commensurate with the scope of the disclosure. Additionally, while various examples of the disclosure have been described, it is to be understood that aspects of the disclosure may include only some of the described examples. Accordingly, the disclosure is not to be seen as limited by the foregoing description, but is only limited by the scope of the appended claims.

What is claimed is:

1. A method of controlling a moving component (22, 24) approaching a buffer (42, 46) in a hoistway (34) of an elevator system (20), the method comprising:

a) calculating, based on a current velocity of the moving component (22, 24), a required braking distance to decelerate the moving component (22, 24) to a maximum buffer impact velocity;

b) comparing the required braking distance to a current buffer distance between the moving component (22, 24) and the buffer (42, 46) to give a comparison result;

c) repeating steps a) and b) one or more times; and d) triggering an emergency stop of the moving component (22, 24) based on the comparison result;

wherein the emergency stop is triggered in response to the comparison result indicating that the current buffer distance is equal to or less than the required braking distance.

2. A method as claimed in claim 1, comprising repeating step a), and optionally step b), based on an updated current velocity of the moving component (22, 24).

3. A method as claimed in claim 1, comprising repeating steps a) and b) at a rate based on a measurement rate of the current velocity of the moving component (22, 24).

4. A method as claimed in claim 1, comprising repeating steps a) and b) a plurality of times when the current buffer distance between the moving component (22, 24) and the buffer (42, 46) is less than a pre-set value.

5. A method as claimed in claim 1, wherein one or more repetitions of steps a) and b) are separated by one second or less, 500 ms or less, 100 ms or less, 50 ms or less, or 10 ms or less.

6. A method as claimed in claim 1, wherein calculating the required braking distance to decelerate the moving component (22, 24) to a maximum buffer impact velocity comprises calculating the motion of the moving component (22, 24) following an emergency stop condition being met.

7. A method as claimed in claim 6, comprising calculating the required braking distance using expected constant accelerations of the moving component (22, 24) in different phases of an emergency stop.

8. A method as claimed in claim 6, wherein calculating the motion of the moving component (22, 24) comprises calculating a first distance to be travelled by the moving component (22, 24) in a reaction time between an emergency stop condition being met and one or more emergency stop actions occurring.

9. A method as claimed in claim 6, wherein calculating the motion of the moving component (22, 24) comprises calculating a second distance to be travelled by the moving component (22, 24) in a brake drop delay time between an emergency stop action occurring and a substantive braking force being generated.

10. A method as claimed in claim 6, wherein calculating the motion of the moving component (22, 24) comprises calculating a third distance to be travelled by the moving component (22, 24) in a braking time between the substantive braking force being generated and the moving component (22, 24) being decelerated to the maximum buffer impact velocity.

11. A method as claimed in claim 6, wherein calculating the motion of the moving component (22, 24) comprises using a mass of the moving component (22, 24).

12. A method as claimed in claim 1, wherein the moving component (22, 24) is an elevator car (24) or an elevator counterweight (26).

13. A method as claimed in claim 1, comprising calculating a current buffer distance from an absolute position of the moving component (22, 24)

in the hoistway (34).

14. An elevator system (20) comprising:

a moving component (22, 24) arranged to move along a hoistway (34);

a buffer (42, 46) located in the hoistway (34) to limit the movement of the moving component (22, 24); and a controller configured to:

a) calculate, based on a current velocity of the moving component (22, 24), a required braking distance to decelerate the moving component (22, 24) to a maximum buffer impact velocity;

b) compare the required braking distance to a current buffer distance between the moving component (22, 24) and the buffer (42, 46) to give a comparison result;

c) repeat steps a) and b) one or more times; and d) trigger an emergency stop of the moving component (22, 24) based on the comparison result;

wherein the emergency stop is triggered in response to the comparison result indicating that the current buffer distance is equal to or less than the required braking distance.

15. An elevator system (20) as claimed in claim 14, wherein the moving component (22, 24) is an elevator car (24) or an elevator counterweight (26).

* * * * *